(12) United States Patent
Kamio (10) Patent No.: US 12,280,790 B2
(45) Date of Patent: Apr. 22, 2025

(54) CONTROL DEVICE FOR MOBILE BODY

(71) Applicant: DENSO CORPORATION, Kariya (JP)

(72) Inventor: Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 202 days.

(21) Appl. No.: 18/152,840

(22) Filed: Jan. 11, 2023

(65) Prior Publication Data

US 2023/0159040 A1    May 25, 2023

Related U.S. Application Data (63) Continuation of application No. PCT/JP2021/022476, filed on Jun. 14, 2021.

(30) Foreign Application Priority Data

Jul. 13, 2020  (JP) ................. 2020-119784

(51) Int. Cl.
*B60W 50/02*    (2012.01)
*B60W 10/08*    (2006.01)
*B60W 10/18*    (2012.01)
*B60W 30/14*    (2006.01)

(52) U.S. Cl.
CPC ........ *B60W 50/0205* (2013.01); *B60W 10/08* (2013.01); *B60W 10/18* (2013.01); *B60W 30/14* (2013.01); *B60W 2710/083* (2013.01)

(58) Field of Classification Search
CPC .. B60W 50/0205; B60W 10/08; B60W 10/18; B60W 30/14; B60W 2710/083
USPC ................................................ 701/99
See application file for complete search history.

(56) References Cited

U.S. PATENT DOCUMENTS

| | | | |
|---|---|---|---|
| 2013/0229052 A1 | 9/2013 | Kitanaka | |
| 2021/0031749 A1* | 2/2021 | Tsukamoto | ........... B60W 10/08 |

FOREIGN PATENT DOCUMENTS

| | | | |
|---|---|---|---|
| JP | 2006-312424 A | | 11/2006 |
| JP | 2007-28733 A | | 2/2007 |
| JP | 2018042403 A | * | 3/2018 |

* cited by examiner

*Primary Examiner* — Isaac G Smith
(74) *Attorney, Agent, or Firm* — Oliff PLC (57) ABSTRACT

A control device is installable in a mobile body movable based on a power outputted from each of a plurality of motor sections. The control device includes: a plurality of motor controllers configured to separately control the plurality of respective motor sections; and a plurality of monitoring sections configured to separately monitor presence or absence of an abnormality in the plurality of respective motor controllers. In response to either one of the plurality of monitoring sections detecting the abnormality in the motor controller, abnormal one of the motor controllers is caused to stop controlling the motor section while the normal one of the motor controllers where no abnormality is detected is caused to continue to control the motor section.

5 Claims, 8 Drawing Sheets

CONTROL DEVICE FOR MOBILE BODY

CROSS-REFERENCE TO RELATED APPLICATION

This application is the U.S. bypass application of International Application No. PCT/JP2021/022476, filed on Jun. 14, 2021 which designated the U.S. and claims priority to Japanese Patent Application No. 2020-119784, filed on Jul. 13, 2020, the contents of both of which are incorporated herein by reference.

TECHNICAL FIELD

The present disclosure relates to a control device for mobile bodies.

BACKGROUND

JP 2007-28733 A describes a conventional vehicle. The vehicle includes, as power sources for the travel thereof, a first motor generator and a second motor generator. In addition, the vehicle includes a first inverter device and a first ECU for driving the first motor generator and a second inverter device and a second ECU for driving the second motor generator. In response to detection of an abnormality in, for example, the first inverter device, the vehicle causes the first motor generator to stop and drives the second motor generator, thereby performing evaluation driving.

SUMMARY

A control device according to an aspect of the present disclosure is a control device installable in a mobile body movable based on a power outputted from each of a plurality of motor sections, the control device including: a plurality of motor controllers configured to separately control the plurality of respective motor sections; and a plurality of monitoring sections configured to separately monitor presence or absence of an abnormality in the plurality of respective motor controllers. In response to either one of the plurality of monitoring sections detecting the abnormality in the motor controller, the abnormal one of the motor controllers is caused to stop controlling the motor section while the normal one of the motor controllers where no abnormality is detected is caused to continue to control the motor section.

BRIEF DESCRIPTION OF THE DRAWINGS

The above features of the present disclosure will be made clearer by the following detailed description, given referring to the appended drawings. In the accompanying drawings:

FIGS. 6(A) to (G) are timing charts illustrating transitions of a first distribution torque calculation value T411, a filtered first distribution torque calculation value T411$f$, a first distribution torque command value T41\*, a second distribution torque calculation value T421, a filtered second distribution torque calculation value T421$f$, a second distribution torque command value T42\*, and an output torque Tm of a motor generator calculated by the control device of the embodiment;

FIGS. 7(A) to (F) are timing charts illustrating transitions of a pressing amount AP of an accelerator pedal, an operation position of a brake pedal, an output torque of a first motor coil, an output torque from a second motor coil, an output torque of the motor generator, and a braking force of a braking device in the vehicle of the embodiment; and FIGS. 8(A) to (F) are timing charts illustrating transitions of the pressing amount AP of the accelerator pedal, the operation position of the brake pedal, the output torque of the first motor coil, the output torque of the second motor coil, the output torque of the motor generator, and the braking force of the braking device in the vehicle of the embodiment.

DETAILED DESCRIPTION OF THE PREFERRED EMBODIMENTS

A vehicle as described in JP 2007-28733 A would suffer an abnormality occurring in either a first ECU or a second ECU. Examples of a method of detecting an abnormality in an ECU include a method including comparing calculation results of two ECUs with each other, i.e., detecting an abnormality by mutual monitoring. However, although allowing detection of occurrence of an abnormality in either one of two ECUs, application of mutual monitoring does not allow identification of the ECU having the abnormality. In other words, information indicating that calculation results of the ECUs are different from each other is not sufficient to determine which one of the calculation results of the ECUs is erroneous, so that it is not possible to identify which one of the two ECUs has the abnormality. Accordingly, in a case where an abnormality occurs in either one of the two ECUs, two motor generators inevitably need to be stopped, which leads to concern that evacuation travel fails to be performed.

Thus, it is the fact that even though a conventional control device for vehicles includes controllers such as ECUs in the form of a double system, it fails to cause a vehicle to keep on traveling if an abnormality occurs in either one of the two controllers.

It should be noted that such a problem is not unique to vehicles but is a common problem for mobile bodies that are movable based on the power of a motor.

An object of the present disclosure is to provide a control device for mobile bodies that enables a mobile body to keep on moving even in a case where an abnormality occurs in either one of a plurality of motor controllers.

A control device according to an aspect of the present disclosure is a control device installable in a mobile body movable based on a power outputted from each of a plurality of motor sections, the control device including: a plurality of motor controllers configured to separately control the plurality of respective motor sections; and a plurality of monitoring sections configured to separately monitor presence or absence of an abnormality in the plurality of respective motor controllers. In response to either one of the plurality of monitoring sections detecting the abnormality in the motor controller, the abnormal one of the motor controllers is caused to stop controlling the motor section while the normal one of the motor controllers where no abnormality is detected is caused to continue to control the motor section.

By virtue of this configuration, a plurality of monitoring sections separately monitor a plurality of motor controllers, which enables, if an abnormality occurs in any one of the plurality of motor controllers, the abnormality to be detected by the monitoring section corresponding to the motor controller where the abnormality occurs. Therefore, the motor controller where the abnormality occurs can be identified based on which one of the plurality of monitoring sections detects the abnormality. In addition, by virtue of the above-described configuration, the abnormal motor controller stops controlling a motor section while the normal motor controller continues to control a motor section, which enables a movement of the mobile body to be continued even if an abnormality occurs in any one of the plurality of controllers.

Description will be made below on an embodiment of a control device for vehicles with reference to the drawings. For the purpose of facilitating an understanding of the description, like reference numerals are attached to the same components in the drawing as much as possible and a redundant description is omitted.

First, description will be made on a schematic configuration of a vehicle to be equipped with a control device of the present embodiment.

Figure 1:
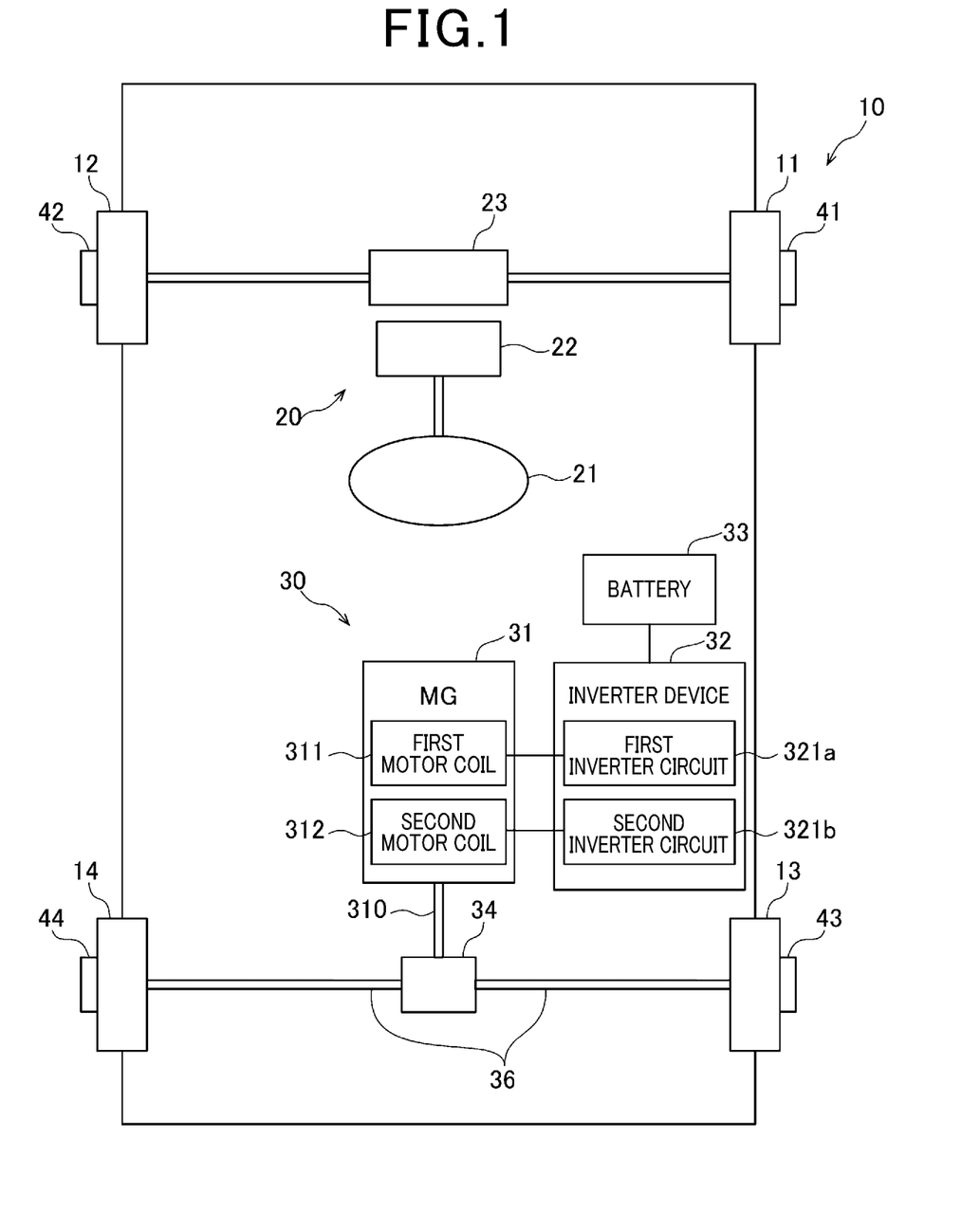
FIG. 1 is a block diagram illustrating a schematic configuration of a vehicle of an embodiment.

A vehicle 10 of the present embodiment illustrated in FIG. 1 is a so-called electric vehicle that travels with use of a motor generator 31 as a power source. In the present embodiment, the vehicle 10 corresponds to a mobile body and the travel of the vehicle 10 corresponds to the movement of the mobile body. As illustrated in FIG. 1, the vehicle 10 includes a steering device 20, a power system 30, and braking devices 41 to 44.

The steering device 20 has a so-called steer-by-wire configuration, in which a steering wheel 21 to be operated by a driver is not mechanically connected to wheels 11, 12. The steering device 20 includes a steering angle sensor 22 and a turning device 23. The steering angle sensor 22 detects a rotation angle of the steering wheel 21, or steering angle. The turning device 23 changes respective turning angles of the right front wheel 11 and the left front wheel 12 based on the steering angle detected by the steering angle sensor 22.

The power system 30 includes a motor generator (MG: Motor Generator) 31, an inverter device 32, a battery 33, and a differential gear 34.

The motor generator 31 includes a first motor coil 311 and a second motor coil 312, which are independent of each other. The first motor coil 311 and the second motor coil 312 both apply torque to an output shaft 310 of the motor generator 31 based on energization. In the motor generator 31, torque can be applied to the output shaft 310 by energizing either one of the first motor coil 311 and the second motor coil 312. A total value of the torque applied to the output shaft 310 from the first motor coil 311 and the torque applied to the output shaft 310 from the second motor coil 312 is the output torque of the motor generator 31. In the present embodiment, the motor coils 311, 312 correspond to a motor section.

The motor generator 31 operates as an electric motor during an accelerated travel of the vehicle 10. In a case where it operates as an electric motor, the motor generator 31 is driven based on a three-phase alternating-current power supplied from the inverter device 32. The power of the motor generator 31 is transmitted from the output shaft 310 to a right rear wheel 13 and a left rear wheel 14 via the differential gear 34 and a drive shaft 36, thereby applying the torque to the rear wheels 13, 14 to cause the vehicle 10 to acceleratingly travel.

The motor generator 31 can operate as an electrical generator during a decelerated travel of the vehicle 10. In a case where it operates as an electrical generator, the motor generator 31 performs a regenerative operation to generate an electric power. The regenerative operation of the motor generator 31 causes a braking force to be applied to each of the rear wheels 13, 14. A three-phase alternating-current power generated by the regenerative operation of the motor generator 31 is converted to a direct-current power through the inverter device 32 and charged in the battery 33.

Thus, in the vehicle 10 of the present embodiment, the right rear wheel 13 and the left rear wheel 14 function as drive wheels and the right front wheel 11 and the left front wheel 12 function as slave wheels. Hereinafter, the right rear wheel 13 and the left rear wheel 14 are also collectively referred to as drive wheels 13, 14 for the purpose of convenience.

The inverter device 32 includes a first inverter circuit 321a corresponding to the first motor coil 311 and a second inverter circuit 321b corresponding to the second motor coil 312. The first inverter circuit 321a and the second inverter circuit 321b convert the direct-current power supplied from the battery 33 to a three-phase alternating-current power and supply the converted three-phase alternating-current power to the first motor coil 311 and the second motor coil 312 of the motor generator 31, respectively.

The braking devices 41 to 44 are provided on the wheels 11 to 14 of the vehicle 10, respectively. The braking devices 41 to 44 include, for example, rotating bodies rotatable integrally with the wheels 11 to 14, brake pads provided facing the rotating bodies, and hydraulic circuits that apply hydraulic pressure to the brake pads to cause the brake pards to come into contact with and separate from the rotating bodies. In the braking devices 41 to 44, the brake pads are brought into contact with the rotating bodies by virtue of the hydraulic pressure from the hydraulic circuits, causing friction force to be applied to the rotating bodies to apply a braking force to the wheels 11 to 14.

Next, a specific description will be made on an electrical configuration of the vehicle 10 with reference to FIG. 2.

Figure 2:
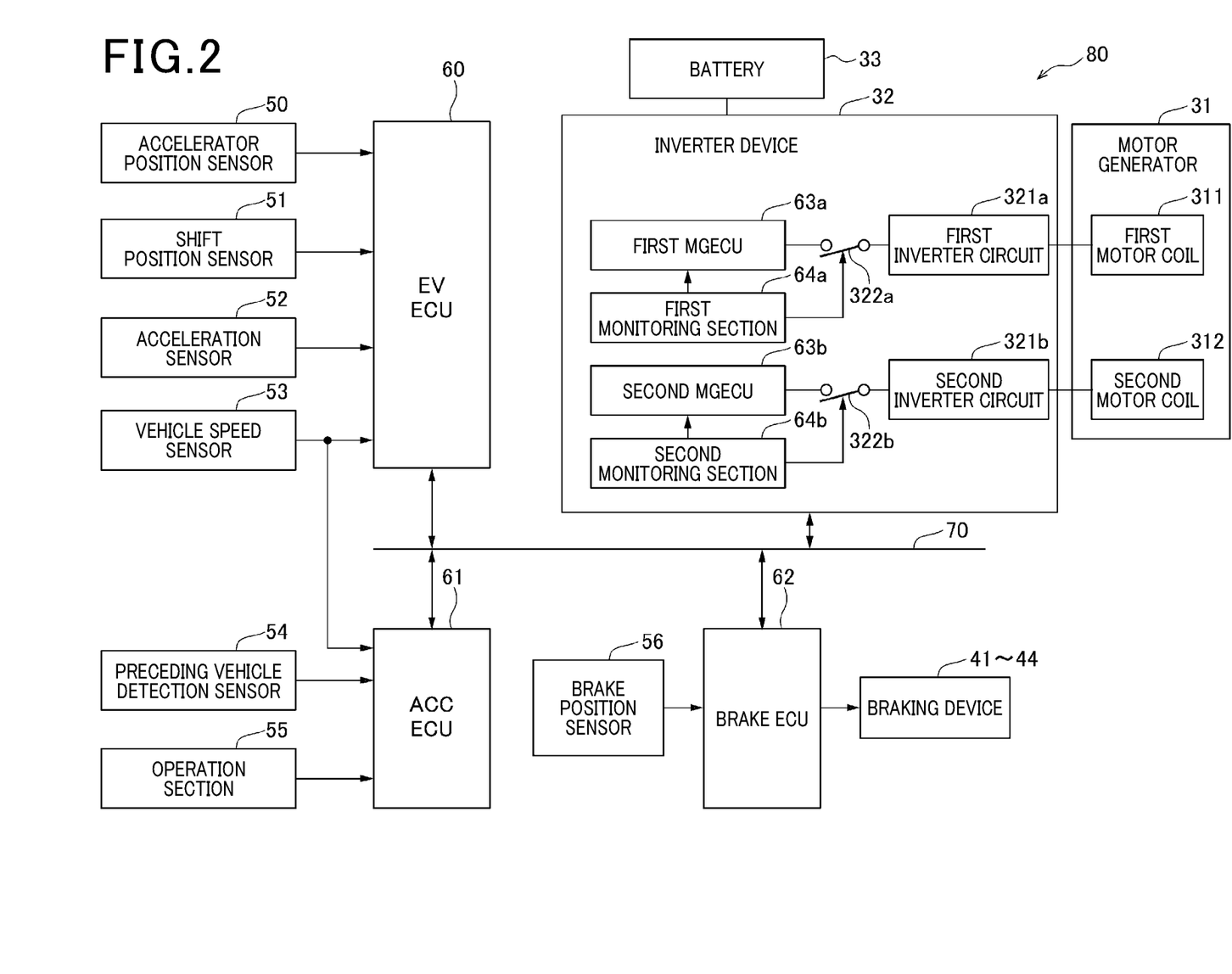
FIG. 2 is a block diagram illustrating a schematic configuration of a control device of the vehicle of the embodiment.

As illustrated in FIG. 2, the vehicle 10 includes an accelerator position sensor 50, a shift position sensor 51, an acceleration sensor 52, a vehicle speed sensor 53, a preceding vehicle detection sensor 54, an operation section 55, and a brake position sensor 56. The vehicle 10 also includes, as sections that perform various controls, an EV (Electric Vehicle) ECU (Electronic Control Unit) 60, an ACC (Adaptive Cruise Control) ECU 61, a brake ECU 62, and MGE-CUs 63a, 63b. These components provide a control device 80 of the present embodiment.

The accelerator position sensor 50 detects a pressing amount of the accelerator pedal of the vehicle 10 and outputs a signal corresponding to the detected pressing amount of the accelerator pedal to the EVECU 60.

The shift position sensor 51 detects an operation position of a shift lever of the vehicle 10 and outputs a signal corresponding to the detected operation position of the shift lever to the EVECU 60.

The acceleration sensor 52 detects an acceleration in a forward direction of the vehicle 10 and outputs a signal corresponding the detected acceleration to the EVECU 60. In a case where the vehicle 10 is accelerated in the forward direction, the acceleration sensor 52 detects a positive acceleration. In a case where the vehicle 10 is decelerated in the forward direction, the acceleration sensor 52 detects a negative acceleration.

The vehicle speed sensor 53 detects a speed of travel in the forward direction, or vehicle speed, of the vehicle 10 and outputs a signal corresponding to the detected vehicle speed to the EVECU 60 and the ACCECU 61.

The preceding vehicle detection sensor 54 detects a preceding vehicle traveling in front of the vehicle 10 and outputs information regarding the detected preceding vehicle to the ACCECU 61. An imaging device that captures an image of a sight in front of the vehicle 10 to detect a preceding vehicle, a millimeter-wave radar that detects a preceding vehicle based on a reflection wave of an electric wave radiated in front of the radar vehicle 10, and the like are usable as the preceding vehicle detection sensor 54.

The operation section 55 is a section to be operated by a passenger of the vehicle 10. The operation section 55 is capable of, for example, an operation to automatically control the travel of the vehicle 10 to cause it to follow the preceding vehicle, or operation to switch a so-called ACC function on and off, an operation to set the speed of travel of the speed vehicle 10, and the like while the ACC function is ON. The operation section 55 sends information regarding an operation applied to the operation section 55 to the ACCECU 61.

The brake position sensor 56 detects an operation position of the brake pedal of the vehicle 10 and outputs a signal corresponding to the detected operation position of the brake pedal to the brake ECU 62.

The ECUs 60 to 62, 63*a*, 63*b* each consist mainly of a microcomputer including a CPU, a memory, and the like. The ECUs 60 to 62, 63*a*, 63*b* can receive a variety of information through an in-vehicle network 70 installed in the vehicle 10, such as a CAN.

The ACCECU 61 executes a program stored in a memory thereof in advance, thereby performing an ACC control of the vehicle 10. Specifically, the ACCECU 61 performs the ACC control in response to the operation section 55 detecting that the ACC function is turned on.

For example, in a case where the ACC function is turned on, the ACCECU 61 sets an ACC flag Fa ON and then sends the ACC flag Fa to the EVECU 60. In contrast, in a case where the ACC function is turned off, the ACCECU 61 sets the ACC flag Fa OFF and then sends the ACC flag Fa to the EVECU 60. The EVECU 60 can determine whether the ACC function is ON or OFF based on whether the ACC flag Fa is ON or OFF.

In a case where no preceding vehicle is detected by the preceding vehicle detection sensor 54 with the ACC function being turned on, the ACCECU 61 sends a first ACC torque command value T21* to the EVECU 60 along with the ACC flag Fa. The first ACC torque command value T21* is a target value of torque to be outputted from the motor generator 31 to cause the vehicle 10 to travel at a constant speed of travel set by the operation section 55. The EVECU 60 controls the motor generator 31 based on the first ACC torque command value T21*, causing the vehicle 10 to travel at the set speed.

In contrast, in a case where a preceding vehicle traveling in front of the vehicle 10 is detected by the preceding vehicle detection sensor 54 with the ACC function being turned on, the ACCECU 61 calculates a relative speed, a relative distance, and the like of the preceding vehicle based on detection information from the preceding vehicle detection sensor 54. The ACCECU 61 calculates a second ACC torque command value T22* based on the relative speed, the relative distance, and the like of the preceding vehicle and sends the calculated second ACC torque command value T22* to the EVECU 60 along with the ACC flag Fa. The second ACC torque command value T22* it a target value of torque to be outputted from the motor generator 31 to maintain the relative distance between the vehicle 10 and the preceding vehicle at a predetermined distance. The second ACC torque command value T22* is set at a positive value in a case where the vehicle 10 needs accelerating, whereas being set at a negative value in a case where the vehicle 10 needs decelerating. The EVECU 60 controls the motor generator 31 based on the second ACC torque command value T22*, causing the vehicle 10 to follow the preceding vehicle with a predetermined inter-vehicle distance being maintained.

Thus, in a case where the ACC function is ON, the first ACC torque command value T21* or the second ACC torque command value T22* is sent from the ACCECU 61 to the EVECU 60 along with the ACC flag Fa set ON. In contrast, in a case where the ACC function is OFF, the ACC flag Fa set OFF is sent from the ACCECU 61 to the EVECU 60. In the present embodiment, the ACCECU 61 corresponds to a cruise controller that performs a cruise control of the vehicle 10.

Figure 3:
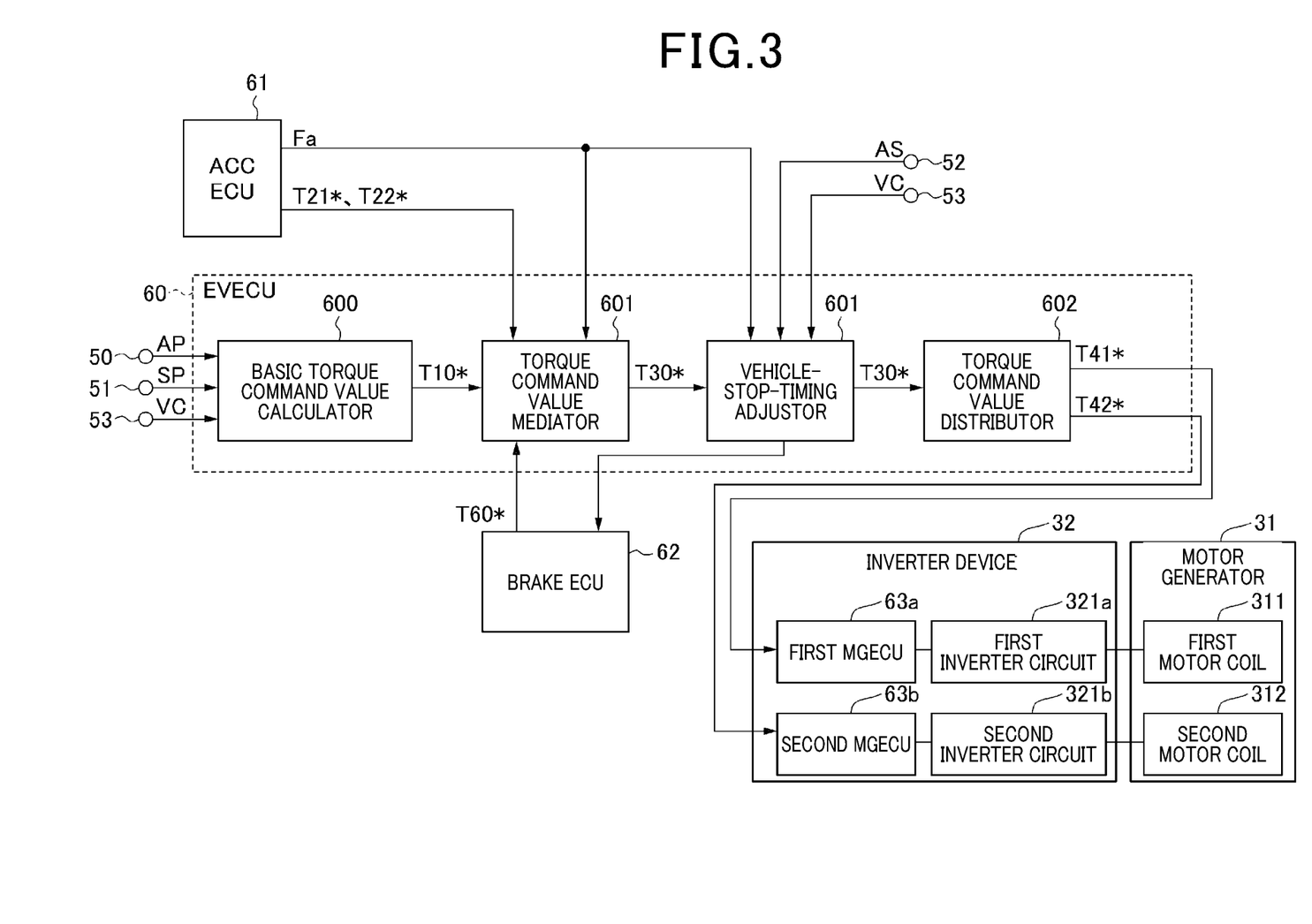
FIG. 3 is a block diagram illustrating a procedure of control of the control device of the embodiment.

The EVECU 60 is a section that executes a program stored in a memory thereof in advance, thereby controlling the state of travel of the vehicle 10 in an integrative manner. In the present embodiment, the EVECU 60 corresponds to an integration controller. As illustrated in FIG. 3, the EVECU 60 includes a basic torque command value calculator 600, a torque command value mediator 601, and a torque command value distributor 602.

The respective output signals from the accelerator position sensor 50, the shift position sensor 51, and the vehicle speed sensor 53 are inputted to the basic torque command value calculator 600. The basic torque command value calculator 600 acquires information regarding a pressing amount AP of the accelerator pedal, a shift position SP, and a vehicle speed VC based on the output signals from the sensors. The basic torque command value calculator 600 has a plurality of maps for calculating a basic torque command value T10* from the pressing amount AP of the accelerator pedal and the vehicle speed VC. The plurality of maps are prepared in advance corresponding to a plurality of respective operation positions at which the shift lever can be operated to set. The basic torque command value calculator 600 determines which one of the plurality of maps is to be used based on information regarding the operation position of the shift lever and calculates the basic torque command value T10* based on the pressing amount AP of the accelerator pedal and the vehicle speed VC from the determined map. The basic torque command value calculator 600 outputs the calculated basic torque command value T10* to the torque command value mediator 601.

The basic torque command value T10*, which is calculated by the basic torque command value calculator 600, and the ACC flag Fa and the ACC torque command value T21* or T22*, which are sent from the ACCECU 61, are inputted to the torque command value mediator 601. In a case where the ACC flag Fa is OFF, i.e, the ACC function is OFF, the torque command value mediator 601 sends the basic torque command value T10* as a final torque command value T30* to the torque command value distributor 602. In contrast, in a case where the ACC flag Fa is ON, i.e, the ACC function is ON, the torque command value mediator 601 sends the first ACC torque command value T21* or the second ACC torque command value T22*, which is sent from the ACCECU 61, as the final torque command value T30* to the torque command value distributor 602.

The torque command value distributor 602 calculates a first distribution torque command value T41* and a second distribution torque command value T42* based on the final torque command value T30* sent from the torque command value mediator 601. The first distribution torque command value T41* is a target value of torque to be outputted from the first motor coil 311 of the motor generator 31. The second distribution torque command value T42* is a target value of torque to be outputted from the second motor coil 312 of the motor generator 31. The torque command value distributor 602 sets the first distribution torque command value T41* and the second distribution torque command value T42* such that a total value of the first distribution torque command value T41* and the second distribution torque command value T42* reaches the final torque command value T30*. For example, the torque command value distributor 602 sets each of the first distribution torque command value T41* and the second distribution torque command value T42* at a half of the final torque command value T30*, or T30*/2. The torque command value distributor 602 sends the calculated first distribution torque command value T41* and second distribution torque command value T42* to the inverter device 32.

The MGECUs 63a, 63b are provided in the inverter device 32. The MGECUs 63a, 63b are in the form of microcomputers independent of each other. The MGECUs 63a, 63b control the motor coils 311, 312 of the motor generator 31 based on the first distribution torque command value T41* and the second distribution torque command value T42* sent from the torque command value distributor 602, respectively.

Specifically, the first MGECU 63a calculates an energization control value based on the first distribution torque command value T41* and drives the first inverter circuit 321a based on the calculated energization control value, thereby controlling the first motor coil 311. Likewise, the second MGECU 63b calculates an energization control value based on the second distribution torque command value T42* and drives the second inverter circuit 321b based on the calculated energization control value, thereby controlling the second motor coil 312. This causes torque corresponding to the first distribution torque command value T41* to be applied to the output shaft 310 of the motor generator 31 from the first motor coil 311 and torque corresponding to the second distribution torque command value T42* to be applied to the output shaft 310 of the motor generator 31 from the second motor coil 312. As a result, the torque corresponding to the final torque command value T30* is outputted from the motor generator 31. In the present embodiment, the MGECUs 63a, 63b correspond to motor controllers that separately control the motor coils 311, 312, respectively.

By virtue of performing the process as above, the ACC torque command values T21*, T22* have higher priority than the basic torque command value T10* in a case where the ACC function is ON, causing the torque corresponding to the first ACC torque command value T21* or the second ACC torque command value T22* to be outputted from the motor generator 31. In the present embodiment, the control of the motor generator 31 to be performed by the cooperation between the EVECU 60 and the ACCECU 61 corresponds to the ACC control.

The brake ECU 62 executes a program stored in a memory thereof in advance, thereby controlling the braking devices 41 to 44. Specifically, in response to detecting that the brake pedal is pressed with a foot based on the operation position of the brake pedal detected by the brake position sensor 56, the brake ECU 62 drives the braking devices 41 to 44 to apply a braking force to each of the wheels 11 to 14.

In addition, in response to detecting that the brake pedal is pressed with a foot, the brake ECU 62 sends a braking torque command value T60* to the torque command value mediator 601 of the EVECU 60 as illustrated in FIG. 3. The braking torque command value T60* is a target value of a braking-direction torque to be outputted from the motor generator 31 to decelerate the vehicle 10. In a case where the braking torque command value T60* is sent from the brake ECU 62, the torque command value mediator 601 gives higher priority to the braking torque command value T60* than the basic torque command value T10* and the ACC torque command values T21*, T22* and sends the braking torque command value T60* as the final torque command value T30* to the torque command value distributor 602. The torque command value distributor 602 calculates the first distribution torque command value T41* and the second distribution torque command value T42* based on the final torque command value T30* and the MGECUs 63a, 63b control energization of the motor coils 311, 312 of the motor generator 31 based on the distribution torque command values T41*, T42*, respectively. This causes the motor generator 31 to perform the regenerative operation. As a result, a braking force corresponding to the braking torque command value T60* is applied to the drive wheels 13, 14 from the motor generator 31. The brake ECU 62 sets the braking torque command value T60* such that a total of the braking force to be obtained by driving the braking devices 41 to 44 and the braking force to be obtained by the regenerative operation of the motor generator 31 reaches a target value of braking force required for the vehicle 10. Hereinbelow, the regeneration control of the motor generator 31 to be performed by the cooperation of the EVECU 60 and the brake ECU 62 is referred to as regeneration cooperation control. In the present embodiment, the brake ECU 62 corresponds to a brake controller that controls the braking devices 41 to 44 of the vehicle 10.

Thus, in the vehicle 10 of the present embodiment, the motor coils of the motor generator 31 have a double-system structure and the ECUs, which control the motor generator 31, also have a double-system structure. Further, in the vehicle 10 of the present embodiment, sections that monitor presence or absence of abnormalities in the MGECUs 63a, 63b are also configured as a double system.

Specifically, the inverter device 32 includes a first monitoring section 64a, a second monitoring section 64b, a first switching element 322a, and a second switching element 322b as illustrated in FIG. 2.

The first switching element 322a connects and disconnects, based on switching thereof between on and off, a signal line through which a control signal is to be transmitted from the first MGECU 63a to the first inverter circuit 321a. The second switching element 322b connects and disconnects, based on switching thereof between on and off, a signal line through which a control signal is to be transmitted from the second MGECU 63b to the second inverter circuit 321b.

The first monitoring section 64a monitors whether an abnormality occurs in the first MGECU 63a. The second monitoring section 64b monitors whether an abnormality occurs in the second MGECU 63b. The monitoring sections 64a, 64b are in the form of logic circuits independent of each other or microcomputers or the like independent of each other.

For example, any abnormality detection method, such as a method of detecting an abnormality in a ROM or a RAM of a microcomputer based on checksum or a method of detecting an abnormality in a CPU of a microcomputer based on a watch dog signal, is applicable as a method for the monitoring sections 64a, 64b to detect abnormalities in the MGECUs 63a, 63b.

In a case where the first MGECU 63a is normal, the first monitoring section 64a keeps the first switching element 322a ON. In this case, the first MGECU 63a can control energization of the first motor coil 311 of the motor generator 31 through the first inverter circuit 321a. In contrast, in a case where an abnormality in the first MGECU 63a is detected, the first monitoring section 64a turns the first switching element 322a OFF. In this case, the first MGECU 63a is prohibited from controlling energization of the first motor coil 311 of the motor generator 31. The second monitoring section 64b likewise controls the second switching element 322b in accordance with presence or absence of an abnormality in the second MGECU 63b.

In addition, in a case where the first MGECU 63a is normal, the first monitoring section 64a sends a first abnormality detection flag XMG1 set at 0. to the EVECU 60. In contrast, in a case where an abnormality in the first MGECU 63a is detected, the first monitoring section 64a sends the first abnormality detection flag XMG1 set at 1. to the EVECU 60. The second monitoring section 64b likewise sends a second abnormality detection flag XMG2 according to presence or absence of an abnormality in the second MGECU 63b to the EVECU 60. In response to either one of the abnormality detection flags XMG1, XMG2 becoming 1, or an abnormality occurring in either one of the MGECUs 63a, 63b, the EVECU 60 performs an evacuation travel control, or causes the normal MGECU to continue the control of the motor generator 31 so that the vehicle 10 can travel to a safe place.

Thus, in the vehicle 10 of the present embodiment, in response to occurrence of an abnormality in either one of the MGECUs 63a, 63b, the energization control of one of the motor coils 311, 312 corresponding to the MGECU suffering the occurrence of the abnormality is prohibited. Such a control of the motor coils 311, 312 substantially halves the output torque of the motor generator 31, which would lead to a rapid change in the output torque of the motor generator 31. This becomes a factor for causing a shock or the like to the vehicle 10.

In addition, the ACC control and the regeneration cooperation control, which are to be performed by the EVECU 60, are to be performed on the assumption that both the motor coil 311, 312 normally operate. Therefore, if the output torque of the motor generator 31 is substantially halved due to the occurrence of an abnormality in either one of the MGECUs 63a, 63b, the ACC control and the regeneration cooperation control fail to be appropriately performed, which would result in an unstable behavior of the vehicle 10.

Accordingly, in response to the occurrence of an abnormality in either one of the MGECUs 63a, 63b, the EVECU 60 of the present embodiment prohibits the ACC control and the regeneration cooperation control from being performed and controls the motor generator 31 to prevent the output torque from rapidly changing.

Next, description will be made on a procedure of a process to be performed by the EVECU 60 with reference to FIG. 4 and FIG. 5. It should be noted that the EVECU 60 repeatedly performs the process illustrated in FIG. 4 and FIG. 5 in a predetermined cycle.

Figure 4:
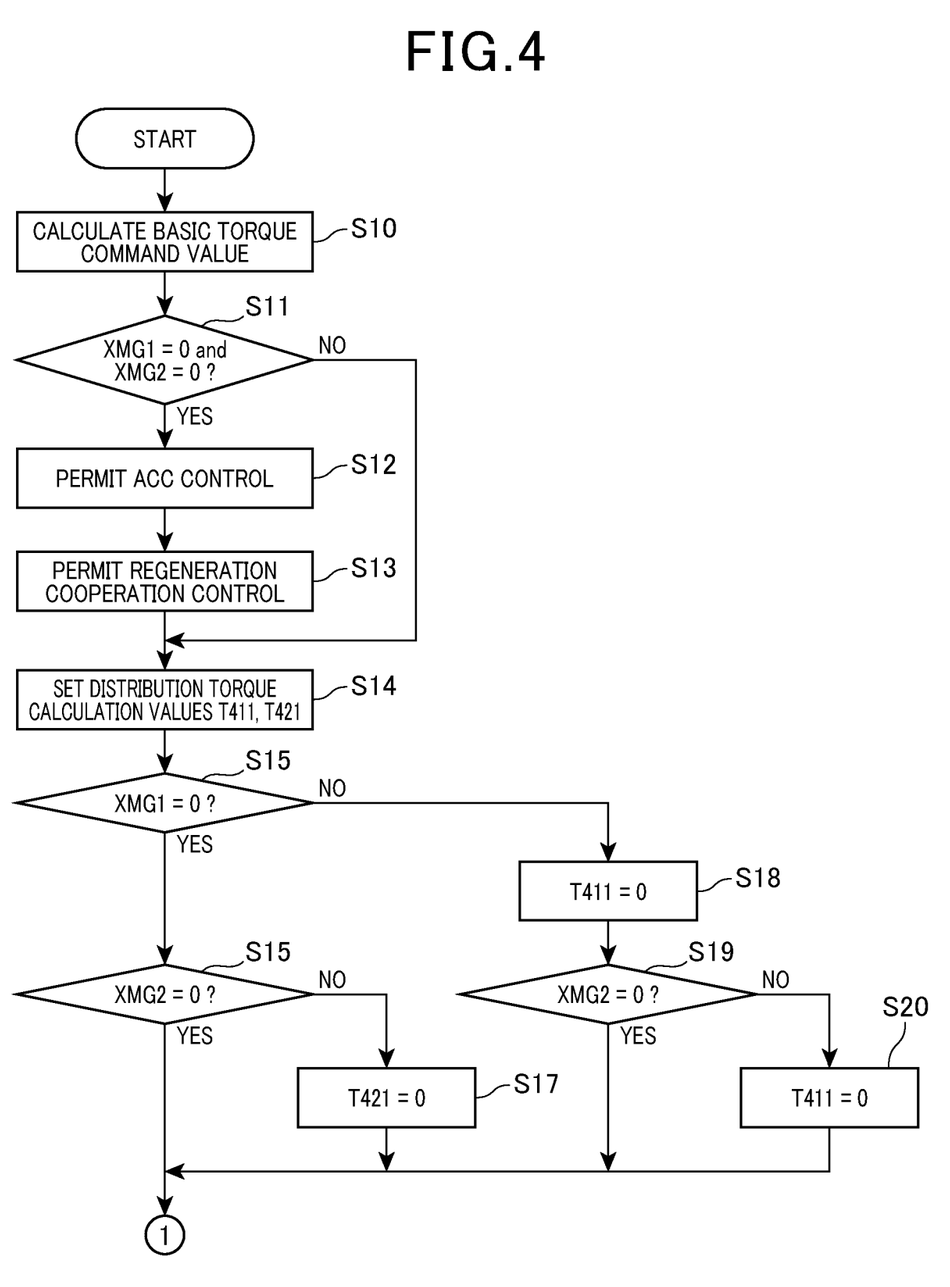
FIG. 4 is a flowchart illustrating a part of a procedure of a process to be performed by the control device of the embodiment.

As illustrated in FIG. 4, the basic torque command value calculator 600 of the EVECU 60 first calculates, as a process in Step S10, the basic torque command value T10* based on the information regarding the pressing amount AP of the accelerator pedal, the shift position SP, and the vehicle speed VC.

The torque command value mediator 601 of the EVECU 60 determines, as a process in Step S11 subsequent to Step S10, whether both the abnormality detection flags XMG1, XMG2 are 0. In response to a positive determination being made in the process in Step S11, or in response to the MGECUs 63a, 63b both being normal, the EVECU 60 permits, as processes in Steps S12, S13, the ACC control and the regeneration cooperation control to be performed. Specifically, the torque command value mediator 601 sets the final torque command value T30* based on not only the basic torque command value T10* obtained through the process in Step S10 but also the ACC flag Fa and the ACC torque command values T21*, T22* sent from the ACCECU 61 and the braking torque command value T60* sent from the brake ECU 62.

In contrast, in response to a negative determination being made in the process in Step S11, or in response to either one of the MGECUs 63a, 63b being abnormal, the torque command value mediator 601 skips the processes in the Steps S12, S13. In this case, the torque command value mediator 601 directly sets the basic torque command value T10* as the final torque command value T30* without using the ACC flag Fa and the ACC torque command values T21*, T22* sent from the ACCECU 61 and the braking torque command value T60* sent from the brake ECU 62. This substantially prohibits the ACC control and the regeneration cooperation control from being performed. Thus, in the present embodiment, in a case where either one of the MGECUs 63a, 63b is abnormal, the ACC control and the regeneration cooperation control are prohibited from being performed to prevent the behavior of the vehicle 10 from becoming unstable.

After the final torque command value T30* is set in the above manner, the torque command value distributor 602 of the EVECU 60 sets, as a process in Step S14, the first distribution torque calculation value T411 and the second distribution torque calculation value T421. Specifically, the torque command value distributor 602 sets each of the first distribution torque calculation value T411 and the second distribution torque calculation value T421 at a half of the final torque command value T30*, or T30*/2.

The torque command value distributor 602 determines, as a process in Step S15 subsequent to Step S14, whether the first abnormality detection flag XMG1 is 0. In response to the first abnormality detection flag XMG1 being 0, or in response to the first MGECU 63a being normal, the torque command value distributor 602 makes a positive determination in the process in Step S15 and determines, as a process in subsequent Step S16, whether the second abnormality detection flag XMG2 is 0. In response to the second abnormality detection flag XMG2 being 0, or in response to the second MGECU 63b also being normal, the torque command value distributor 602 makes a positive determination in the process in Step S16 and the process proceeds to Step S21 and subsequent steps illustrated in FIG. 5. In this case, the first distribution torque calculation value T411 and the second distribution torque calculation value T421 are both set at T30*/2.

Figure 5:
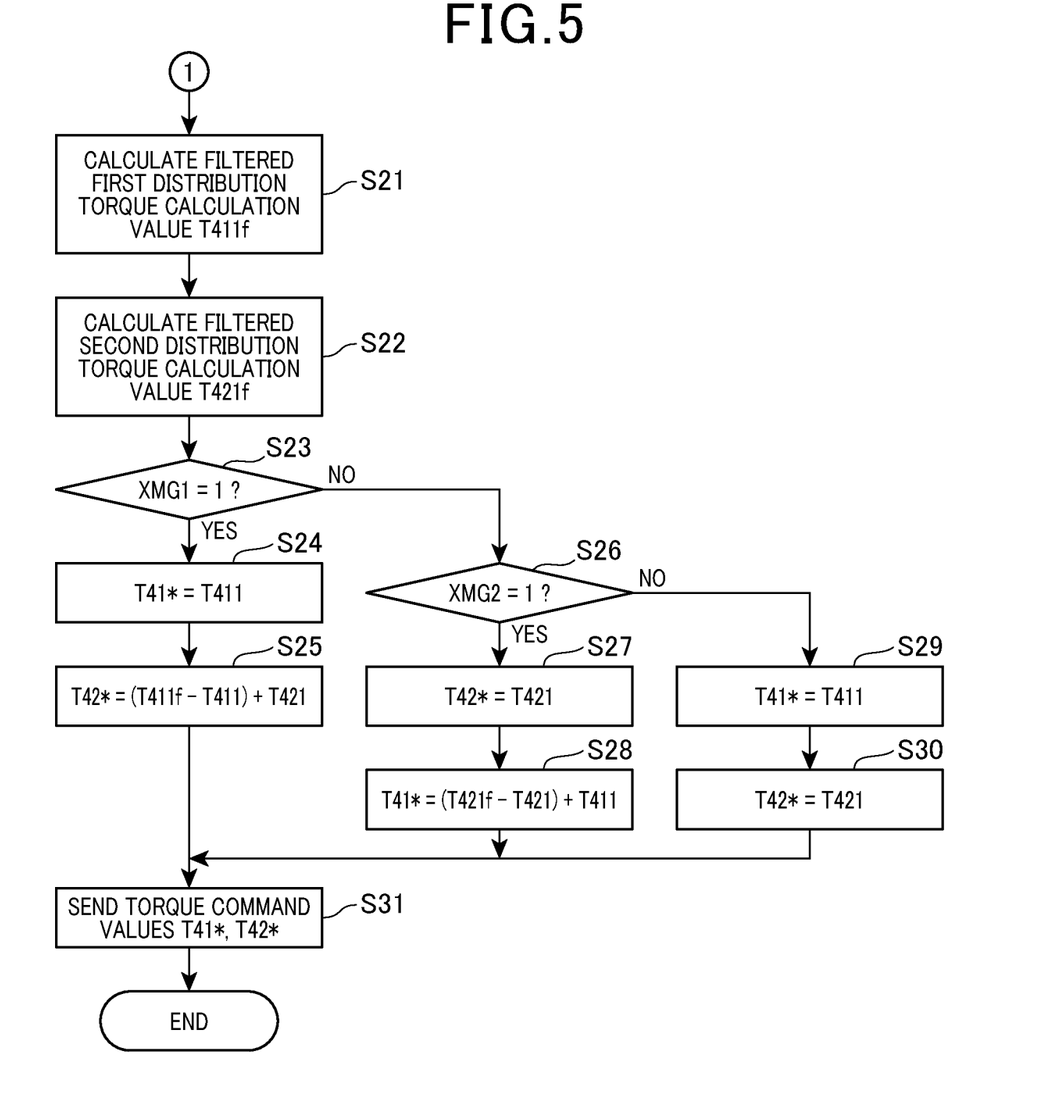
FIG. 5 is a flowchart illustrating a part of the procedure of the process to be performed by the control device of the embodiment.

In contrast, in response to a negative determination being made in the process in Step S16, or in response to an abnormality occurring in the second MGECU 63b, the torque command value distributor 602 sets, as a process in Step S17, the second distribution torque calculation value T421 at 0. and then the process proceeds to Step S21 and subsequent steps illustrated in FIG. 5. In this case, the first distribution torque calculation value T411 is set at T30*/2, whereas the second distribution torque calculation value T421 is set at 0.

In contrast, in response to a negative determination being made in the process in Step S15, or in response to an abnormality occurring in the first MGECU 63a, the torque command value distributor 602 sets, as a process in Step S18, the first distribution torque calculation value T411 at 0. Subsequently, the torque command value distributor 602 determines, as a process in Step S19, whether the second abnormality detection flag XMG2 is 0. In response to the second abnormality detection flag XMG2 being 0, or in response to the second MGECU 63b being normal, the torque command value distributor 602 makes a positive determination in the process in Step S19 and the process proceeds to Steps S21 and subsequent steps illustrated in FIG. 5. In this case, the first distribution torque calculation value T411 is set at 0, whereas the second distribution torque calculation value T421 is set at T30*/2.

Further, in response to a negative determination being made in the process in Step S19, or in response to an abnormality occurring in the second MGECU 63b, the torque command value distributor 602 sets, as a process in Step S20, the second distribution torque calculation value T421 at 0. and then the process proceeds to Step S21 and subsequent steps illustrated in FIG. 5. In this case, the first distribution torque calculation value T411 and the second distribution torque calculation value T421 are both set at 0.

Thus, the torque command value distributor 602 sets the torque command value corresponding to the normal MGECU at T30*/2, whereas setting the torque command value corresponding to the abnormal MGECU at 0.

As illustrated in FIG. 5, the torque command value distributor 602 applies, as a process in Step S21, a filtering process based on a low-pass filter to the first distribution torque calculation value T411 based on a current value of the first distribution torque calculation value T411 and past calculation values including a previous value of the first distribution torque calculation value T411, thereby obtaining a filtered first distribution torque calculation value T411f. The torque command value distributor 602 likewise applies, as a process in Step S22 subsequent to Step S21, a filtering process based on a low-pass filter to the second distribution torque calculation value T421, thereby obtaining a filtered second distribution torque calculation value T421f.

The torque command value distributor 602 determines, as a process in Step S23 subsequent to Step S22, whether the first abnormality detection flag XMG1 is 1. In response to a positive determination being made in the process in Step S23, the torque command value distributor 602 determines that an abnormality occurs in the first MGECU 63a and the second MGECU 63b is normal. In this case, the torque command value distributor 602 sets, as a process in subsequent Step S24, the first distribution torque command value T41* as the first distribution torque calculation value T411. In addition, the torque command value distributor 602 calculates, as a process in Step S25, the second distribution torque command value T42* from the filtered first distribution torque calculation value T411f, the first distribution torque calculation value T411, and the second distribution torque calculation value T421 based on an expression f1 below.

$$T42^* = (T411f - T411) + T421 \tag{f1}$$

In contrast, in response to a negative determination being made in the process in Step S23, or in response to the first MGECU 63a being normal, the torque command value distributor 602 determines, as a process in Step S26, whether the second abnormality detection flag XMG2 is 1. In response to a positive determination being made in the process in Step S26, the torque command value distributor 602 determines that an abnormality occurs in the second MGECU 63b and the first MGECU 63a is normal. In this case, the torque command value distributor 602 sets, as a process in subsequent Step S27, the second distribution torque command value T42* as the second distribution torque calculation value T421. In addition, the torque command value distributor 602 calculates, as a process in Step S28, the first distribution torque command value T41* from the filtered second distribution torque calculation value T421f, the second distribution torque calculation value T421, and the first distribution torque calculation value T411 based on an expression f2 below.

$$T41^* = (T421f - T421) + T411 \tag{f2}$$

In response to a negative determination being made in the process in Step S26, the torque command value distributor 602 determines that the first MGECU 63a and the second MGECU 63b are both normal. In this case, the torque command value distributor 602 sets, as a process in Step S29, the first distribution torque command value T41* as the first distribution torque calculation value T411 and sets, as a process in Step S30, the second distribution torque command value T42* as the second distribution torque calculation value T421.

After performing any one of the processes in Step S25, Step S28, and Step S30, the torque command value distributor 602 sends, as a process in Step S31, the calculated first distribution torque command value T41* and second distribution torque command value T42* to the first MGECU 63a and the second MGECU 63b, respectively.

Figure 6:
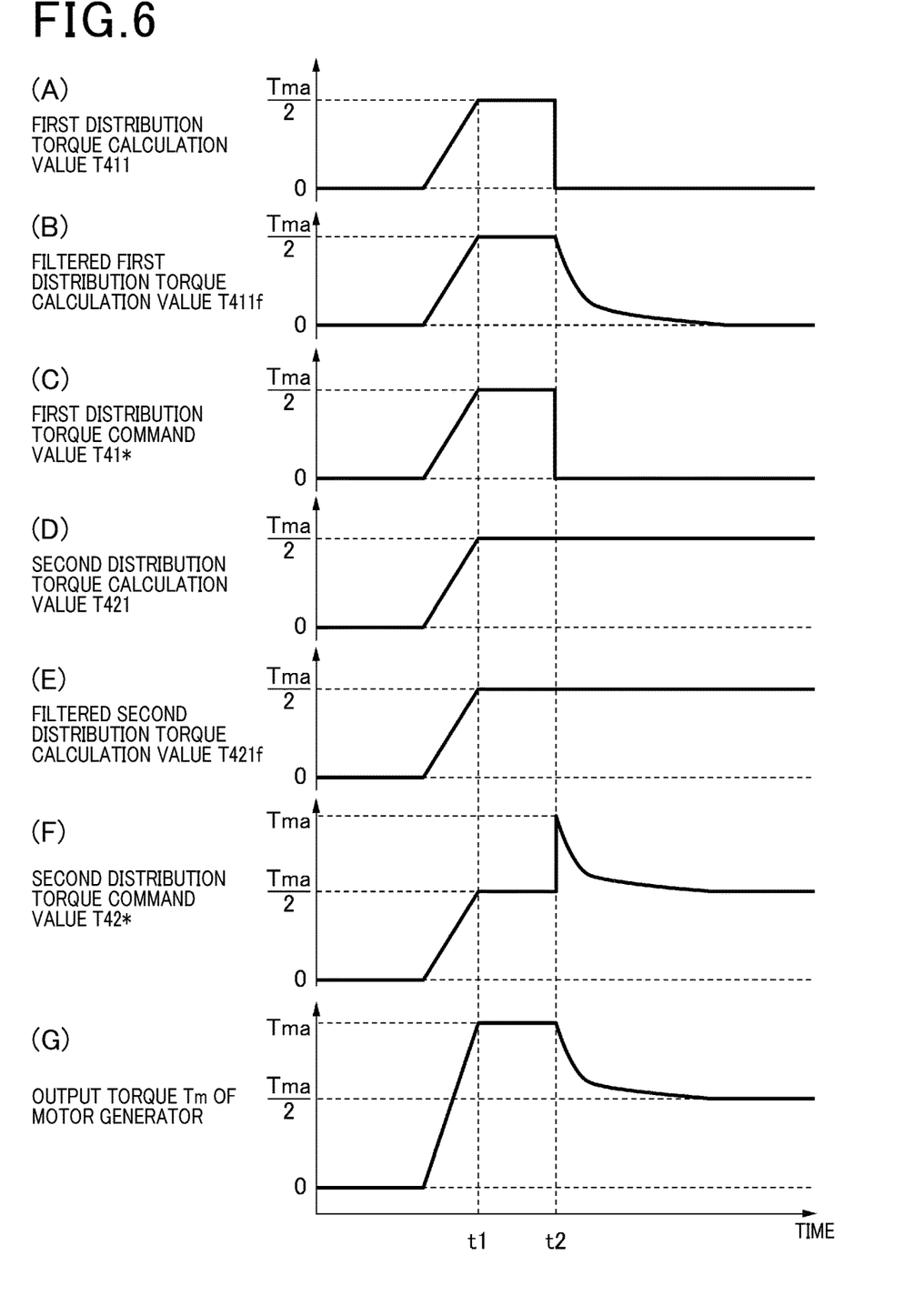

Next, referring to FIG. 6, description will be made on transitions of the first distribution torque calculation value T411, the filtered first distribution torque calculation value T411f, the first distribution torque command value T41*, the second distribution torque calculation value T421, the filtered second distribution torque calculation value T421f, the second distribution torque command value T42*, and the output torque Tm of the motor generator 31 after the process illustrated in FIG. 4 and FIG. 5 is performed.

For example, it is assumed that the output torque Tm of the motor generator 31 is set at Tma at time t1 as illustrated in FIG. 6(G). At this time, as illustrated in FIGS. 6(A), (D), the first distribution torque calculation value T411 and the second distribution torque calculation value T421 are each set at Tma/2. Under such a situation, it is assumed that an abnormality occurs in the first MGECU 63a at time t2. In this case, as illustrated in FIG. 6(A), the first distribution torque calculation value T411 is changed from Tma/2 to 0 and the first distribution torque calculation value T411 time t2 is maintained at 0 at and after time t2. This causes the filtered first distribution torque calculation value T411f to transition toward 0 in a convergent manner at and after time t2 as illustrated in FIG. 6(B). At this time, the first distribution torque calculation value T411 is still set at the first distribution torque calculation value T411. The first distribution torque command value T41* is thus set at 0. at time t2 and maintained at 0. thereafter as illustrated in FIG. 6(C).

In contrast, in a case where the second MGECU 63b is normal, the second distribution torque calculation value T421 and the filtered second distribution torque calculation value T421f are maintained at Tma/2 even at and after time t2 as illustrated in FIGS. 6(D), (E). A deviation between the first distribution torque calculation value T411 and the filtered first distribution torque calculation value T411f illustrated in FIGS. 6(A), (B) is added to the second distribution torque calculation value T421 to obtain the second distribution torque command value T42*. The second distribution torque command value T42* thus changes such that it temporarily rises to Tma at time t2 and then gradually decreases toward Tma/2 as illustrated in FIG. 6(F).

The torque Tm to be outputted from the output shaft 310 of the motor generator 31 is a total value of the first distribution torque command value T41* illustrated in FIG. 6(C) and the second distribution torque command value T42* illustrated in FIG. 6(F). The output torque Tm of the motor generator 31, which is set at Tma before time t2, thus gradually decreases from Tma toward Tma/2 at and after time t2.

Next, description will be made on an operation example of the vehicle 10 of the present embodiment. First, referring to FIGS. 7(A) to (F), description will be made on an operation example of the vehicle 10 responsive to occurrence of an abnormality in the first MGECU 63a while the accelerator pedal of the vehicle 10 is pressed with a foot, i.e., while the vehicle 10 is being accelerated.

Figure 7:
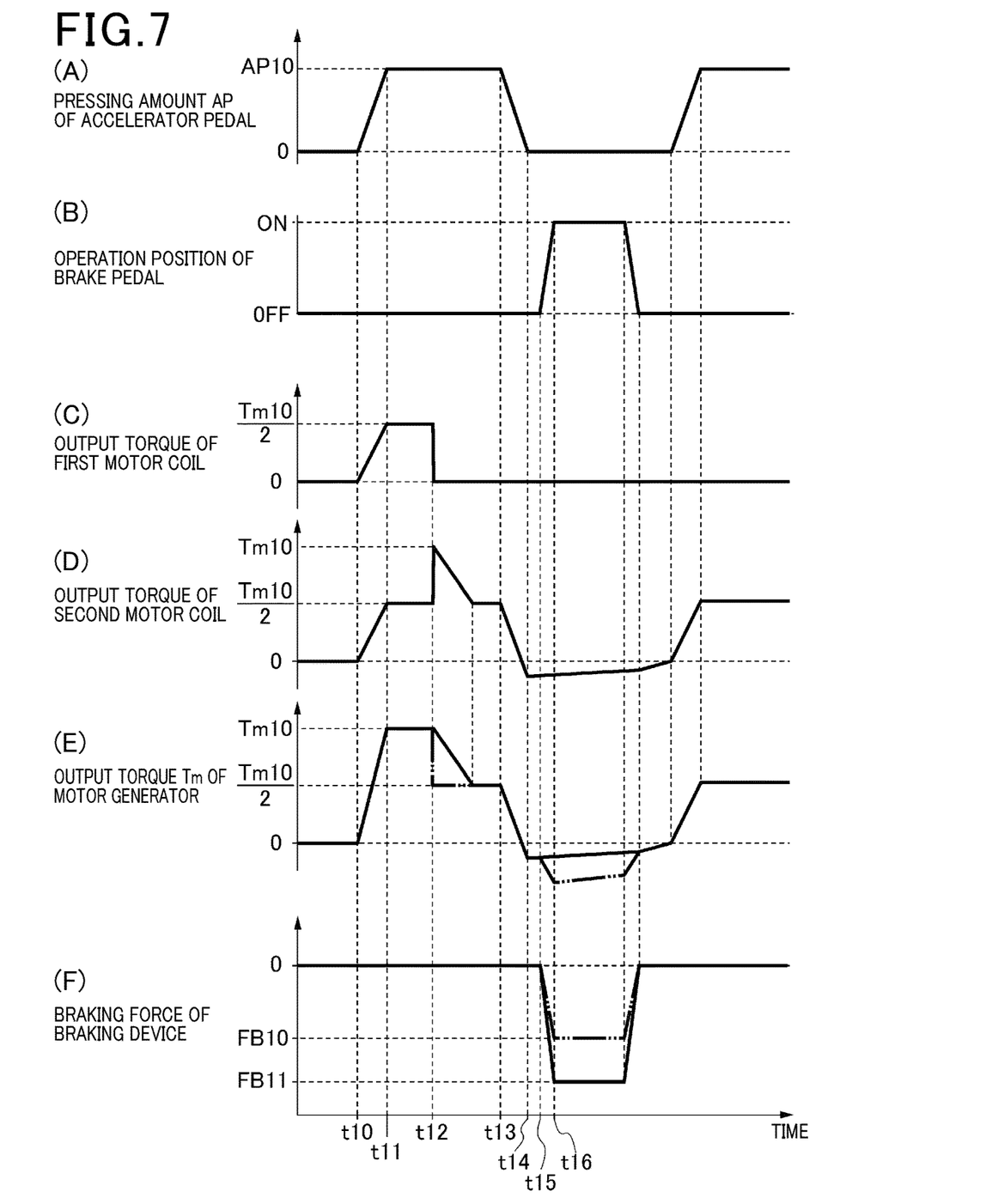

For example, when a driver starts pressing the accelerator pedal of the vehicle 10 with his/her foot at time t10 and the pressing amount AP reaches a predetermined amount AP10 at time t11 as illustrated in FIG. 7(A), a torque Tm10 corresponding to the pressing amount AP10 of the accelerator pedal is outputted from the motor generator 31 as illustrated in FIG. 7(E). In this case, a torque Tm10/2 is applied to the output shaft 310 of the motor generator 31 from each of the motor coils 311, 312 as illustrated in FIGS. 7(C), (D), which causes the output torque of the motor generator 31 to be Tm10. It should be noted that the torques applied to the output shaft 310 of the motor generator 31 from the motor coils 311, 312 are hereinafter referred to as the output torque of the first motor coil 311 and the output torque of the second motor coil 312, respectively.

If an abnormality occurs in the first MGECU 63a at time t12 under such a situation, the first motor coil 311 stops. The output torque of the first motor coil 311 thus becomes 0. as illustrated in FIG. 7(C). At this time, if the output torque of the second motor coil 312 is maintained at Tm10/2, the output torque of the motor generator 31 rapidly changes from Tm10 to Tm10/2 as indicated by a two-dot chain line in FIG. 7(E). This becomes a factor for causing a shock or the like to the vehicle 10.

In this regard, in the vehicle 10 of the present embodiment, in response to an abnormality in the first MGECU 63a being detected by the first monitoring section 64a at time t12, a notification is sent to the EVECU 60, accordingly. In response to an abnormality in the first MGECU 63a being detected, the EVECU 60 calculates the second distribution torque command value T42* based on the above expression f1. This causes the output torque of the second motor coil 312 to rise to Tm10 at time t12 and then gradually decrease toward Tm10/2 as illustrated in FIG. 7(D). As a result, the output torque of the motor generator 31 gradually decreases from Tm10 toward Tm10/2 at and after time t12 as illustrated by a solid line in FIG. 7(E). Therefore, a shock or the like to the vehicle 10 can be reduced.

Then, it is assumed that after the driver releases the accelerator pedal at time t13 and the pressing amount AP of the accelerator pedal reaches 0. at time t14 as illustrated in FIG. 7(A), the driver starts pressing the brake pedal with his/her foot at time t15 and the brake pedal is turned ON at time t16 as illustrated in FIG. 7(B). At this time, if the regeneration cooperation control of the motor generator 31 is directly performed, a sufficient braking force would fail to be secured.

Specifically, in a case where the first MGECU 63a and the second MGECU 63b are both normal, the first motor coil 311 and the second motor coil 312 both perform the regenerative operation, causing a braking force as illustrated by a two-dot chain line in FIG. 7(E) to be applied to the drive wheels 13, 14. However, in a case where the first motor coil 311 stops due to an abnormality in the first MGECU 63a, only the second motor coil 312 performs the regenerative operation, causing the braking force to be applied to the drive wheels 13, 14 from the motor generator 31 to be substantially halved. Therefore, in a case where the brake ECU 62 sets the braking force of the braking devices 41 to 44 at FB10 as illustrated by a two-dot chain line in FIG. 7(F) based on the regeneration cooperation control, the braking force to be applied to the drive wheels 13, 14 decreases in accordance with no braking force being generated from the first motor coil 311. Therefore, a sufficient braking force would fail to be secured.

In this regard, in the vehicle 10 of the present embodiment, the ACC control and the regeneration cooperation control are prohibited from being performed in response to detection of an abnormality in the first MGECU 63a, so that the brake ECU 62 causes the vehicle 10 to stop merely by the braking force of the braking devices 41 to 44. This causes a braking force FB11 larger than the braking force FB10 to be outputted from the braking devices 41 to 44 as illustrated in FIG. 7(F), thus enabling securing a sufficient braking force.

Next, referring to FIGS. 8(A) to (F), description will be made on an operation example of the vehicle 10 responsive to occurrence of an abnormality in the first MGECU 63a while the brake pedal of the vehicle 10 is pressed with a foot, i.e., while the vehicle 10 is being decelerated.

Figure 8:
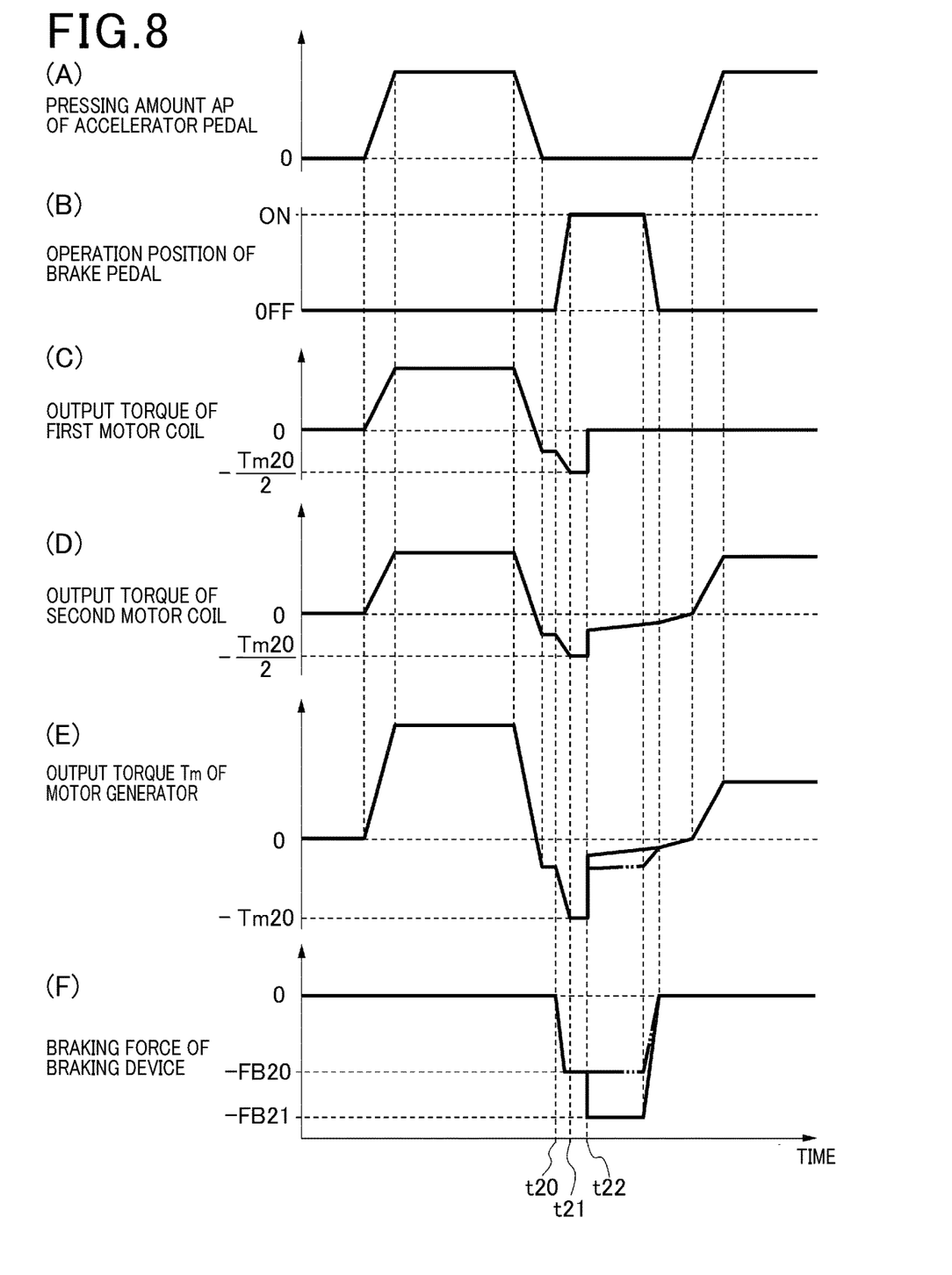

When the driver presses the brake pedal with his/her foot at time t20 and the brake pedal is turned ON at time t21 as illustrated in FIG. 8(B), a torque −Tm20 is outputted from the motor generator 31 as illustrated in FIG. 8(E) and a braking force of −FB20 is applied from the braking devices 41 to 44 to the wheels 11 to 14 as illustrated in FIG. 8(F). By virtue of a net force of the output torque −Tm20 of the motor generator 31 and the braking force −FB20 of the braking devices 41 to 44, the vehicle 10 is decelerated. At this time, as illustrated in FIGS. 8(C), (D), the output torque of each of the first motor coil 311 and the second motor coil 312 is −Tm20/2.

If an abnormality occurs in the first MGECU 63a at time t22 under such a situation, the first motor coil 311 stops. The output torque of the first motor coil 311 thus becomes 0. as illustrated in FIG. 8(C). At this time, if the output torque of the second motor coil 312 is maintained at −Tm20/2 and the braking force of the braking devices 41 to 44 is maintained at −FB20, the braking force of the vehicle 10 substantially decreases by an amount corresponding to −Tm20/2. Therefore, the vehicle 10 would suffer a disadvantage such as an unintentional acceleration.

In this regard, in the vehicle 10 of the present embodiment, in response to an abnormality in the first MGECU 63a being detected by the first monitoring section 64a at time t22, a notification is sent to the EVECU 60, accordingly. The EVECU 60 prohibits, in response to detection of an abnormality in the first MGECU 63a, the ACC control and the regeneration cooperation control from being performed.

This causes the output torque of the second motor coil 312 to be close to 0. as illustrated in FIG. 8(D) and the braking force of the braking devices 41 to 44 to be set at −FB21 larger than −FB20 as illustrated in FIG. 8(F). As a result, the vehicle 10 can be decelerated merely by the braking force of the braking devices 41 to 44, enabling preventing an unintentional acceleration of the vehicle 10 before it happens.

By virtue of the above-described control device 80 for the vehicle 10 of the present embodiment, workings and effects as described in (1) to (4) below are achievable.

(1) In the control device 80 of the present embodiment, the two monitoring sections 64a, 64b separately monitor the two MGECUs 63a, 63b, which enables, if an abnormality occurs in either one of the two MGECUs 63a, 63b, the abnormality to be detected by the monitoring section corresponding to the MGECU where the abnormality occurs. Therefore, the MGECU where the abnormality occurs can be identified based on which one of the two monitoring sections 64a, 64b detects the abnormality. In addition, in response to either one of the monitoring sections 64a, 64b detecting an abnormality in the MGECUs 63a, 63b, the control of the motor coil by the abnormal MGECU is stopped while the control of the motor coil by the normal MGECU where no abnormality is detected is continued. Therefore, even if an abnormality occurs in either one of the two MGECUs, the travel of the vehicle 10 can be continued and the evacuation travel control can be performed with a higher accuracy.

(2) The EVECU 60 causes the MGECUs 63a, 63b to cooperate with controllers different from the MGECUs 63a, 63b, or ACCECU 61 and brake ECU 62, to perform the ACC control and the regeneration cooperation control. In a case where the control of the motor coil by the MGECU where an abnormality occurs is stopped, the total output torque of the two motor coils, i.e., the output torque Tm of the motor generator 31, decreases. If the ACC control and the regeneration cooperation control are continued under such a situation, the ACC control and the regeneration cooperation control fail to be appropriately performed, which would result in an unstable behavior of the vehicle 10. In this regard, the EVECU 60 of the present embodiment prohibits, in response to detection of an abnormality in either one of the two MGECUs 63a, 63b, the ACC control with cooperation between the MGECUs 63a, 63b and the ACCECU 61 and the regeneration cooperation control with cooperation between the MGECUs 63a, 63b and the brake ECU 62, enabling preventing the behavior of the vehicle 10 from becoming unstable.

(3) For example, in a case where an abnormality occurs in the first MGECU 63a, the first motor coil 311, the control of which is to be stopped by the abnormal first MGECU 63a, corresponds to a motor section to be stopped and the second motor coil 312, the control of which is to be continued by the normal second MGECU 63b, corresponds to a motor section to be continued. In stopping the control of the first motor coil 311 by the abnormal first MGECU 63a, the normal second MGECU 63b controls the second motor coil 312 so as to compensate for the output of the first motor coil 311. In addition, in a case where an abnormality occurs in the second MGECU 63b and the first MGECU 63a is normal, the normal first MGECU 63a controls the first motor coil 311 so as to compensate for the output of the second motor coil 312. This configuration can prevent a rapid change in the total output torque of the motor generator 31, making the behavior of the vehicle 10 likely to be stable.

(4) In stopping the control of the first motor coil 311 by the abnormal first MGECU 63a, the normal second MGECU 63b controls the second motor coil 312 so as to cause the total output torque of the first motor coil 311 and the second motor coil 312, or output torque Tm of the motor generator 31, to gradually change. In addition, in stopping the control of the second motor coil 312 by the abnormal second MGECU 63b, the normal first MGECU 63a controls the first motor coil 311 so as to cause the output torque Tm of the motor generator 31 to gradually change. This configuration can prevent a rapid change in the output torque Tm of the motor generator 31, making it possible to reduce a shock or the like to the vehicle 10.

It should be noted that the above-described embodiment can be implemented in the following forms.

The vehicle 10 of the embodiment includes, as two motor sections, the two motor coils 311, 312 provided in the motor generator 31; however, it may alternatively include two motor generators.

In response to occurrence of an abnormality in the first MGECU 63a, the first monitoring section 64a of the embodiment notifies the EVECU 60, accordingly; however, in response to occurrence of an abnormality in the first MGECU 63a, it may alternatively be configured to notify the second monitoring section 64b, accordingly. In this case, the second monitoring section 64b calculates, in response to being notified of the abnormality in the first MGECU 63a, the second distribution torque command value T42\* by using the above expression f1. Likewise, in response to occurrence of an abnormality in the second MGECU 63b, the second monitoring section 64b notifies the first monitoring section 64a, accordingly, and the first monitoring section 64a calculates the first distribution torque command value T41\* based on the notification by using the above expression f2. Such a configuration also makes it possible to achieve the same or similar workings and effects as or to those of the above-described embodiment.

The control device 80 of the embodiment includes the MGECUs 63a, 63b as two motor controllers that control the motor coils 311, 312, respectively; however, two cores provided in a single ECU may alternatively function as the respective two motor controllers.

The control device 80 of the embodiment includes the two MGECUs 63a, 63b; however, it may include a plurality of MGECUs equal to or more than three. In addition, the control device 80 may include three or more monitoring sections corresponding to the plurality of respective MGECUs equal to or more than three.

The configurations of the control device 80 in the embodiments are applicable to not only the electric vehicle 10 but also any mobile body including an electric motor as a power source, examples of which include a mobility such as a vertical takeoff and landing aircraft that moves in the sky.

The control device 80 and the control method thereof according to the present disclosure may be implemented by one or a plurality of dedicated computers each including a processor programed to execute one or a plurality of functions exemplified by a computer program and a memory. The control device 80 and the control method thereof according to the present disclosure may be implemented by a dedicated computer including a processor including one or a plurality of dedicated hardware logic circuits. The control device 80 and the control method thereof according to the present disclosure may be implemented by one or a plurality of dedicated computers each including a combination of a processor programed to execute one or a plurality of functions, a memory, and a processor including one or a plurality of hardware logic circuits. The computer program may be stored as instructions to be executed by a computer in a computer-readable non-transitory tangible recording medium. The dedicated hardware logic circuit and the hardware logic circuit may each be implemented by a digital circuit including a plurality of logic circuits or an analog circuit.

The present disclosure is not limited to the above-described specific examples. The scope of the present disclosure encompasses the above-described specific examples changed in design by those skilled in the art as needed as long as they provide the features of the present disclosure. The components of each of the above-described specific examples and the locations, conditions, shapes, etc., thereof are not limited to those described by way of example and can be changed as needed. A combination of the components of each of the above-described specific examples may be changed as needed unless a technical inconsistency occurs.

What is claimed is:

1. A control device installable in a mobile body movable based on a-power outputted from each of a plurality of motor sections, the control device comprising:
   a plurality of motor controllers configured to respectively control the plurality of motor sections;
   a plurality of monitoring sections configured to respectively monitor presence or absence of an abnormality in the plurality of motor controllers; and
   an integration controller configured to cause the plurality of motor controllers to cooperate with a controller different from the plurality of motor controllers to perform control of movement of the mobile body, wherein
   in response to one of the plurality of monitoring sections detecting the abnormality in the plurality of motor controllers, an abnormal one of the motor controllers is caused to stop controlling the motor section for which the abnormal motor controller would otherwise perform control while a normal one of the motor controllers in which no abnormality is detected is caused to continue to control the motor section for which the normal motor controller performs control, and
   the integration controller is configured to prohibit, in response to detection of the abnormality in the abnormal motor controller, all of the plurality of motor controllers, including the abnormal motor controller, from performing the control of movement with cooperation of the different controller.

2. The control device according to claim 1, wherein
the different controller comprises a brake controller configured to control a braking device of the mobile body.

3. The control device according to claim 1, wherein
the different controller comprises a cruise controller configured to perform a cruise control of the mobile body.

4. The control device according to claim 1, wherein
when the motor section for which the abnormal motor controller would otherwise perform control is a motor section to be stopped and the motor section for which the normal motor controller performs control is a motor section to be continued,
in stopping the control of the motor section to be stopped by the abnormal motor controller, the normal motor controller is configured to control the motor section to be continued so as to compensate for an output of the motor section to be stopped.

5. The control device for mobile bodies according to claim 4, wherein
in stopping the control of the motor section to be stopped by the abnormal motor controller, the normal motor controller is configured to control the motor section to be continued so as to cause a total output torque of the plurality of motor sections to gradually change.

* * * * *